Patented Jan. 8, 1935

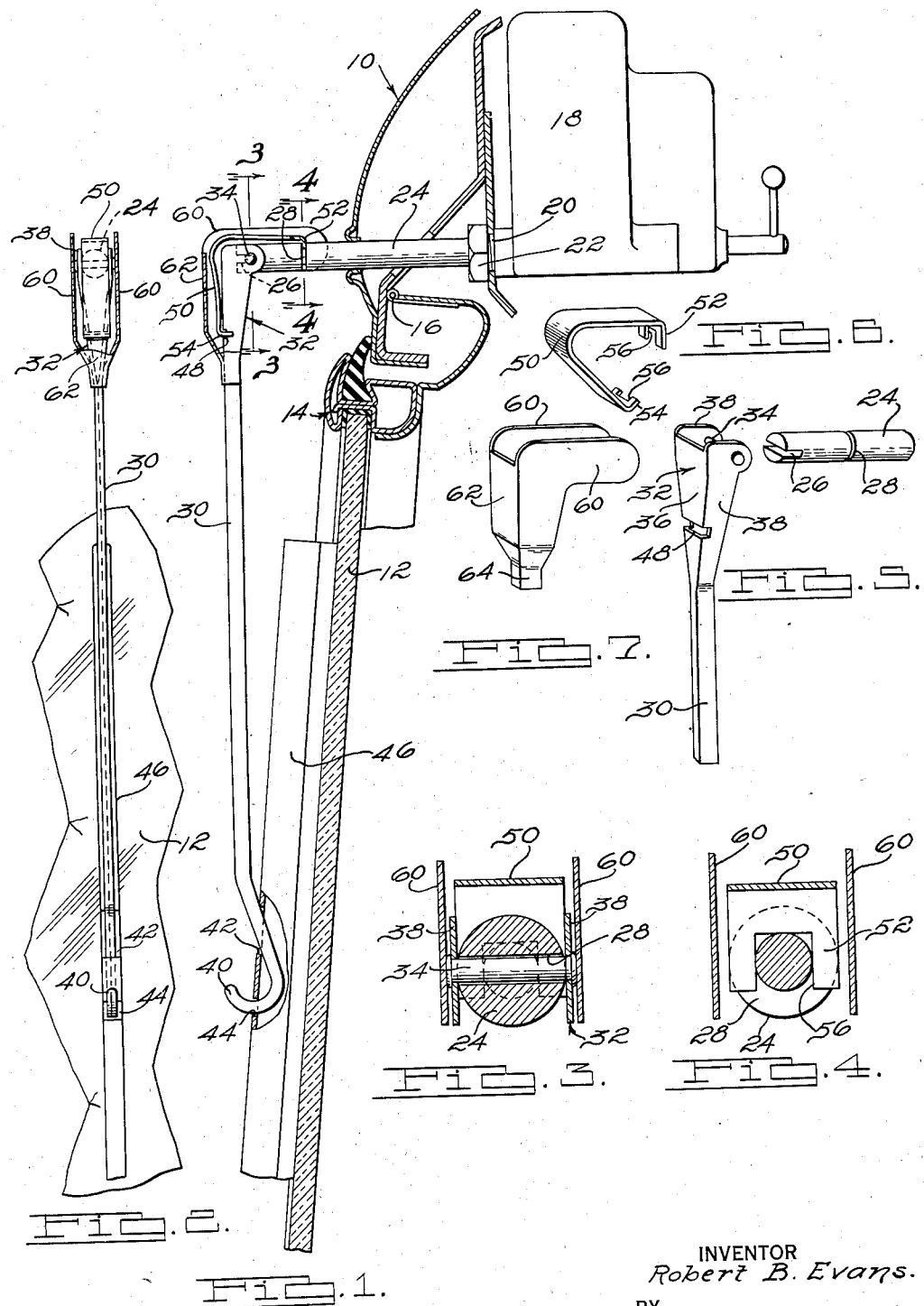
Jan. 8, 1935. R. B. EVANS 1,986,962
WINDSHIELD WIPER ARM CONNECTION
Filed July 3, 1933
INVENTOR
Robert B. Evans.
BY
Harness, Dickey, Pierce & Hann.
ATTORNEYS.

1,986,962

UNITED STATES PATENT OFFICE 1,986,962

WINDSHIELD WIPER ARM CONNECTION

Robert B. Evans, Detroit, Mich., assignor to E. S. Evans & Sons, a corporation of Michigan Application July 3, 1933, Serial No. 678,746

3 Claims. (Cl. 15—255)

This invention relates to a connection adaptable for use between an arm and a shaft, or like members, and is particularly adaptable for use between the arm and shaft of a windshield wiper, the principal object being the provision of such a connection that is simple in construction, efficient in operation, economical to produce and which permits ready and easy application of a wiper arm to or removal from the shaft of a windshield wiper.

Objects of the invention include the provision of means for releasably connecting an arm to a shaft for equal angular movement with the shaft about the axis thereof including a single spring means maintaining the engagement between the arm and the shaft and constantly urging the arm toward a predetermined angular position with respect to the shaft; the provision of an arm having an axially disengageable relatively non-rotatable engagement with a shaft and a spring member engaged with one of the parts releasably engaging the other thereof for maintaining the operativeness of the engagement of the shaft and arm; the provision of a shaft and arm having an axially disengageable relatively non-rotatable engagement relative to the axis of the shaft and a leaf spring member releasably engaged with both the arm and the shaft resiliently maintaining the operativeness of the connection; and the provision of a connection as above described in which either the shaft or arm or both is provided with a notch or groove and the corresponding free end of the spring is shaped to interfit the notch to maintain the operativeness of its engagement therewith.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a fragmentary, partially broken vertical sectional view taken through a portion of the windshield and windshield header of a motor vehicle, showing a windshield wiper assembly mounted thereon including a connection constructed in accordance with the present invention.

Fig. 2 is a front elevational view of the windshield wiper shaft and arm shown in Fig. 1, part of the decorative cap or casing over the connection being broken away to better illustrate the construction.

Fig. 3 is an enlarged vertical sectional view taken on the line 3—3 of Fig. 1.

Fig. 4 is an enlarged vertical sectional view taken on the line 4—4 of Fig. 1.

Fig. 5 is a fragmentary perspective view showing the adjacent ends of the arm and shaft in slightly separated position.

Fig. 6 is a perspective view of the spring member employed for maintaining the operativeness of the connection between the arm and shaft, in free position.

Fig. 7 is a perspective view of the ornamental cap or casing for the connection between the arm and the shaft.

As is well known to those skilled in the art, in windshield wipers of the type employed in connection with automotive vehicles it is desirable to provide a connection between the windshield wiper arm and the windshield wiper shaft that will effectively prevent relative rotational movement of the arm with respect to the shaft about the axis of the shaft and at the same time will constantly urge the windshield wiper blade toward the windshield so as to maintain proper contact therebetween for cleaning purposes. It is desirable that the connection between the arm and the shaft be such as to permit ready application of the arm to or removal from the shaft. The present invention deals with such a connection and, while obviously its use will be applicable to wider uses than illustrated, for the purpose of illustration it is shown solely in connection with its application to a windshield wiper for an automotive vehicle.

Referring to the drawing, a windshield header of known design for a motor vehicle body is indicated generally as at 10 and extending downwardly from the lower edge thereof is a transparent windshield 12 having a frame indicated generally at 14 which may be pivotally secured to the header 10 as at 16. A windshield wiper motor 18 is secured by a hollow stud 20 and nut 22 to a part of the windshield header 10 on the inner side thereof and is provided with the usual oscillatable shaft 24 projecting forwardly through and beyond the windshield header 10. In accordance with the present invention, and as perhaps best indicated in Fig. 5, the projecting end of the shaft 24 is provided with a diametrical slot 26 across its open end. Inwardly from the slot 26 the shaft 24 is provided with a peripheral groove 28. A windshield wiper arm 30 having a yoked upper end indicated generally as at 32 is provided with a pin 34 extending across said yoked end in a direction transverse to the length thereof. The pin 34 is of a size to be slidably but relatively closely receivable in the slot 26, the end of the shaft 24 projecting between the opposite sides of and within the yoked end 32 of the arm to permit such engagement. When the pin 34 is engaged in the slot 26 it will be apparent that the arm 30 is constrained to equal rotational movement with the shaft 24 relative to the axis of the shaft 24 but is angularly movable about the axis of the pin 34 with respect to the shaft 24.

In the particular construction of the arm 30 shown, the arm is formed from sheet metal and, except for the extreme upper end thereof is bent to form a substantially tubular body portion, while the upper end thereof is formed to provide a flat forward face 36 and rearwardly extending side wings 38 forming in effect a yoke as previously described. The lower end of the arm 30 is bent to form a forwardly and upwardly extending hook 40 which is adapted to be engaged through openings 42 and 44 of a windshield wiper blade 46 in order to maintain proper engagement therewith.

The front face 36 of the yoked end 32 is transversely slotted as at 48, best indicated in Fig. 5, which with the groove 28 in the shaft 24 previously described, serves as a means for anchoring the free ends of a spring 50 which maintains the operativeness of the engagement between the arm and shaft. As best indicated in Fig. 6, this spring 50 in its free state is generally of U shape formed from flat or leaf spring stock and has its free ends 52 and 54 respectively bent inwardly and forked or notched as at 56. As indicated best in Fig. 4, the width of the notch 56 in the end 52 is substantially equal to the diameter of the shaft 24 at the bottom of the groove 28 so that this portion of the shaft may be received within the notch 56 as illustrated in Fig. 4. The width of the notch 56 in the end 54 is substantially the same width as the face 36 of the forked end 32 of the arm 30 at the location of the notch 48 so that the end 32 of the arm at this point is received within the notch 56 and opposite sides of the end 54 straddle opposite sides of the end 32 as best illustrated in Figs. 1 and 2.

In operation the pin 34 is inserted in the slot 26 and then either the end 52 or 54 is engaged in its respective groove or notch 28 or 48 and then the spring 50 is stressed and the opposite end thereof is engaged in its respective groove or notch in the other of the members. This places the spring 50 under stress which not only maintains the engagement of the ends 52 and 54 with the shaft and arm 30 respectively, but holds the pin 34 in the slot 26 and tends to rotate the arm 30 in a counter-clockwise direction as viewed in Fig. 1 so as to press the wiper blade 46 against the face of the windshield 12. If it is desired to disengage the arm 30 from the shaft 24 all that is necessary is to turn the arm 30 in a counter-clockwise direction as viewed in Fig. 1 and at the same time pulling the upper end thereof outwardly axially of the shaft 24 to disengage the pin 34 from the slot 26. As soon as the pin is disengaged from the slot in this manner the end 52 may of course be readily disengaged from the groove 28 in the shaft 24 and the arm removed. Disengagement of the arm and shaft may also be accomplished by forcing either the end 52 or 54 of the spring 50 out of its respective notch, particularly when the spring 50 is readily accessible. However, I prefer to provide a cap or casing about the above described connection so as to normally conceal it and its parts from view. Such a cap may be formed as indicated in Fig. 7 and including a pair of sheet metal side members 60 connected across the front thereof by a front wall 62. Preferably the top of the cap or casing is left open for matter of economy in production and to permit greater ease in the assembly and disassembly of the connection between the arm 30 and the shaft 24. Although this cap or casing may be secured over the joint between the arm 30 and shaft 24 in any suitable manner, I prefer to reduce the dimensions of the lower end of the cap as at 64 and to clamp, weld or otherwise fasten this reduced end to the arm 30 so as to fix it in position with respect thereto.

Another important advantage of the present invention is in connection with the ability of the wiper to continue to function when the windshield is pivoted outwardly. In this connection it will be observed that the motor 18 of the wiper is fixed relative to the header 10 and the windshield 12 pivots outwardly relative thereto. Because of my improved form of connection between the shaft 24 and arm 30, the spring 50 will yield to permit a corresponding outwardly pivotal movement of the arm 30 without interfering with the proper operation of the device in any sense whatever.

Formal changes may be made in the specific embodiment of the invention described without departing from the spirit or substance of the broad invention, the scope of which is commensurate with the appended claims.

I claim:

1. In combination, an oscillatable shaft having a slot opening onto one end thereof and a groove in the periphery thereof adjacent said slot, an arm extending angularly with respect to said shaft and having a part rigidly fixed to one end thereof removably receivable in said slot while remaining fixed to said arm for constraining said arm to substantially equal movement with said shaft about the axis thereof, and spring means engaged with said arm and having an end engageable with said groove for maintaining engagement between said arm and shaft.

2. In combination, an oscillatable shaft having a slot opening into one end thereof and a groove in the periphery thereof adjacent said slot, an arm extending angularly with respect to said shaft and having a part at one end thereof removably receivable in said slot for constraining said arm to equal movement with said shaft about the axis thereof, a groove in said arm adjacent said part thereof, and a U-shaped leaf spring having its ends forked and adapted to be releasably received in the grooves in said shaft and arm respectively with the spring in flexed condition, releasably to maintain engagement of said arm and shaft.

3. In combination, an oscillatable shaft having a slot opening onto one end thereof and a groove in the periphery thereof adjacent said slot, an arm extending angularly with respect to said shaft and having a part at one end thereof removably receivable in said slot for constraining said arm to equal movement with said shaft about the axis thereof, a groove in said arm adjacent said part thereof, a U-shaped leaf spring having its ends forked and adapted to be releasably received in the grooves in said shaft and arm respectively with the spring in flexed condition releasably to maintain engagement of said arm and shaft, and a cap secured to said arm and having side portions extending both above and below said shaft and concealing said spring, said cap being open at its top and bottom to provide clearance for said shaft upon angular movement of said arm with respect to the axis of said shaft.

ROBERT B. EVANS.